United States Patent [19]

Candor

[11] Patent Number: 4,767,514
[45] Date of Patent: Aug. 30, 1988

[54] APPARATUS AND METHOD FOR REMOVING LIQUID FROM LIQUID BEARING MATERIAL

[76] Inventor: James T. Candor, 5440 Cynthis La., Dayton, Ohio 45429

[21] Appl. No.: 32,746

[22] Filed: Mar. 31, 1987

[51] Int. Cl.⁴ .................... B01D 57/02; B03C 5/02
[52] U.S. Cl. .................... 204/183.1; 204/182.2; 204/300 R; 204/299 R; 204/304; 204/302; 204/186
[58] Field of Search ............ 204/183.1, 182.2, 180.1, 204/186, 300 R, 299 R, 302, 304, 307; 34/1

[56] References Cited

U.S. PATENT DOCUMENTS

| | | | |
|---|---|---|---|
| 1,838,923 | 12/1931 | Fisher | 204/302 |
| 2,109,125 | 2/1938 | Aldridge et al. | 204/300 X |
| 2,109,130 | 2/1938 | Fisher | 204/300 X |
| 2,209,798 | 7/1940 | Subkow | 204/302 X |
| 2,393,328 | 1/1946 | Mahore | |
| 3,074,870 | 1/1963 | Carswell et al. | 204/302 X |
| 3,641,680 | 2/1972 | Candor et al. | 34/1 |
| 3,931,682 | 1/1976 | Candor | 34/1 |
| 4,055,479 | 10/1977 | King | 204/302 |
| 4,236,317 | 12/1980 | Candor et al. | 204/300 R |
| 4,443,320 | 4/1984 | King | 204/302 |
| 4,561,953 | 12/1985 | Muralidhara et al. | 204/182.3 |

FOREIGN PATENT DOCUMENTS 969884A 12/1980 U.S.S.R. .................... 204/186

Primary Examiner—John F. Niebling
Assistant Examiner—John S. Starsiak, Jr.
Attorney, Agent, or Firm—Candor, Candor & Tassone

[57] ABSTRACT

An apparatus and method for removing liquid from liquid bearing material is provided, the apparatus comprising a pair of spaced apart electrodes for being disposed on opposite sides of the material, a unit for creating an electrostatic field between the electrodes for acting through the material to remove liquid from the material, a plurality of needle-line projections for being disposed in the material between the electrodes to assist in removing liquid from the liquid being material, one of the electrodes having a plurality of openings passing therethrough for respectively receiving the projections therethrough so that the projections can project into the material between the electrodes, and a unit operatively interconnected to the projections to move the projections through the openings of the one electrode to different positions thereof relative to the material between the electrodes and relative to the one electrode.

18 Claims, 3 Drawing Sheets

APPARATUS AND METHOD FOR REMOVING LIQUID FROM LIQUID BEARING MATERIAL

BACKGROUND OF THE INVENTION

1. Field of the Invention

This invention relates to a new apparatus for removing liquid from liquid bearing material and to a new method for removing liquid from liquid bearing material.

2. Prior Art Statement

It is known to provide an apparatus for removing liquid from liquid bearing material and comprising a pair of spaced electrodes for being disposed on opposite sides of the material, means for creating an electrostatic field between the electrodes for acting through the material to remove liquid from the material, and a plurality of needle-like projections for being disposed in the material between the electrodes to assist in removing liquid from the liquid bearing material. For example, see the U.S. patent to Candor, U.S. Pat. No. 4,236,317.

It is also known to have the projections of such an arrangement project through a plurality of opening means passing through one of the electrodes. For example see the U.S. patent to King, U.S. Pat. No. 4,341,617.

While the aforementioned U.S. patent to Candor, U.S. Pat. No. 4,236,317, also describes that the needle-like projections and the electrodes can be sonically or ultrasonically vibrated while the needle-like projections are projecting into and/or through the liquid bearing material that is disposed between the electrodes for further enhancing the electrostatic action in removing liquid from the liquid bearing material, also see the U.S. patent to Candor, U.S. Pat. No. 3,931,682; the U.S. patent to Muralidhara et al, U.S. Pat. No. 4,561,953, and Chapter 14, pages 335-374 of the book *Advances In Solid-Liquid Separation* edited by H. S. Muralidhara for other examples of apparatus that utilize sonic or ultrasonic vibrations in combination with an electrostatic field to remove liquid from liquid bearing material.

SUMMARY OF THE INVENTION

One feature of this invention is to provide a new apparatus and method for removing liquid from liquid bearing material by disposing a plurality of needle-like projections in the material between the electrodes in a unique manner to assist in removing liquid from the liquid bearing material.

In particular, it is believed according to the teachings of this invention that one of the electrodes that is disposed on opposite sides of the liquid bearing material can have a plurality of opening means passing therethrough and respectively receive the plurality of projections therethrough so that the projections can project into the material between the electrodes to different positions thereof relative to the material between the electrodes and relative to that one electrode.

For example, one embodiment of this invention provides an apparatus for removing liquid from liquid bearing material and comprising a pair of spaced apart electrodes for being disposed on opposite sides of the material, means for creating an electrostatic field between the electrodes for acting through the material to remove liquid from the material, a plurality of needle-like projections for being disposed in the material between the electrodes to assist in removing liquid from the liquid bearing material, one of the electrodes having a plurality of opening means passing therethrough respectively receiving the projections therethrough so that the projections can project into the material between the electrodes, and means operatively interconnected to the projections to move the projections through the opening means of that one electrode to different positions thereof relative to the material between the electrodes and relative to that one electrode.

Accordingly, it is an object of this invention to provide a new apparatus for removing liquid from liquid bearing material and having one or more of the novel features of this invention as set forth above or hereinafter shown or described.

Another object of this invention is to provide a new method for removing liquid from liquid bearing material, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
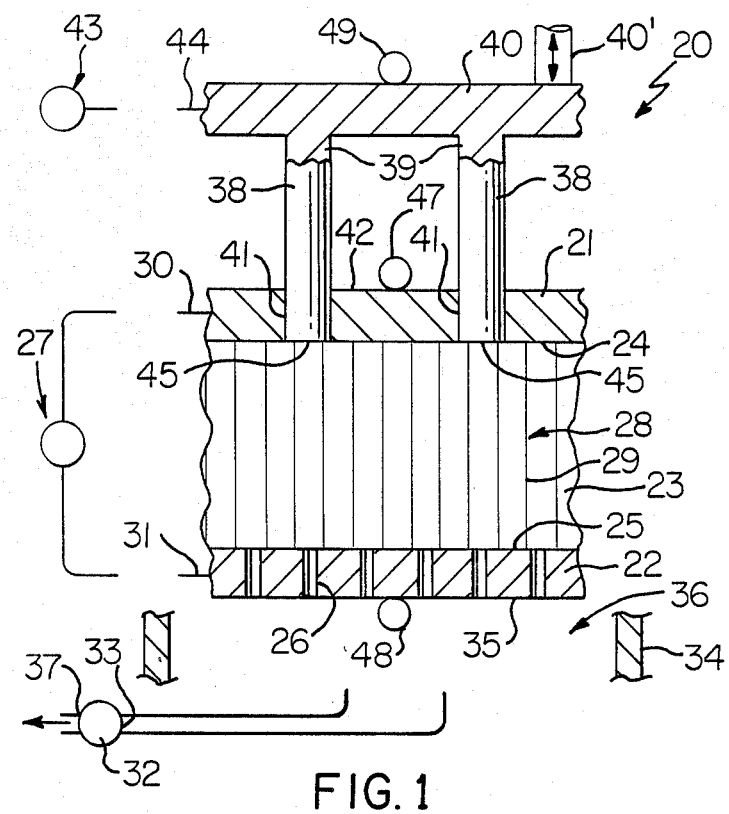
FIG. 1 is a fragmentary cross-sectional view that schematically illustrates the apparatus and method of this invention for removing liquid from liquid bearing material.

While the various features of this invention are hereinafter described and illustrated as being particularly adapted to provide an apparatus and method for dewatering certain types of liquid bearing material, it is to be understood that the various features of this invention can be utilized singly or in various combinations thereof to remove liquid from other types of liquid bearing material or to merely reduce the liquid content of a liquid bearing material with the resulting dewatered product still being considered as being relatively liquid.

Therefore, this invention is not to be limited to only the embodiments illustrated in the drawings, because the drawings are merely utilized to illustrate some of the wide variety of uses of this invention.

Figure 2:
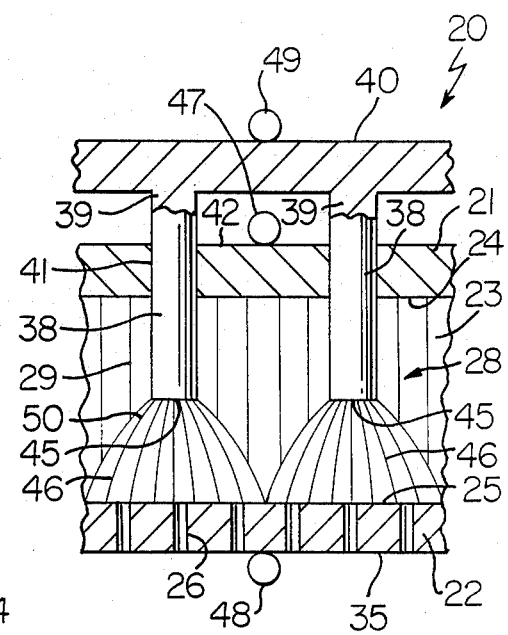
FIG. 2 is a view similar to FIG. 1 and illustrates the apparatus of FIG. 1 in another operating position thereof.

Referring now to FIGS. 1 and 2, the method and apparatus of this invention is generally indicated by the reference numeral 20 and comprises a pair of spaced apart electrodes 21 and 22 disposed on opposite sides of a liquid bearing material 23, such as a slurry of a liquid and particles, fibers, etc., the electrodes 21 and 22 being formed of any suitable electrically conductive material and respectively having facing sides 24 and 25 for being disposed in engagement with the material 23 in any of the manners set forth in the aforementioned three U.S. patents and Chapter 14 of the book *Advances in Solid-Liquid Separation* whereby the U.S. Patent to Candor, U.S. Pat. No. 4,236,317; U.S. Patent to Candor, U.S. Pat. No. 3,931,682, the U.S. Patent to Muralidhara et al, U.S. Pat. No. 4,561,953, and Chapter 14 of the book *Advances in Solid-Liquid Separation* edited by H. S. Muralidhara are being incorporated into this disclosure by this reference thereto not only for the teachings of the apparatus and methods thereof but also for the teachings of some of the types of liquid bearing materials that can be utilized in the apparatus and method 20 of this invention.

Thus, it can be seen that the electrodes 21 and 22 can comprise part of a stationary apparatus wherein the only movement of the electrodes 21 and 22 is that the electrode 21 can move toward the electrode 22 as the liquid in the liquid bearing material 23 is being removed therefrom in a manner hereinafter set forth or that the electrodes 21 and 22 can comprise movable endless belt means for continuously dewatering the material 23 disposed therebetween together with the belt means 21 being movable toward the belt means 22 as the liquid in the liquid bearing material 23 is being removed therefrom as will be apparent hereinafter.

In any event, the lower electrode 22 has a plurality of passages 26 passing completely therethrough and normally being of a size that will permit liquid of the liquid bearing material 23 to pass therethrough without any substantial amount of the solid particles of the material 23 passing through the passages 26 in a manner well known in the art of dewatering material, such as suspensions, slurries or sludges of particles and liquids, etc.

The apparatus 20 comprises means 27 for creating an electrostatic field or electric field 28 between the electrodes 21 and 22 for acting through the material 23 to remove liquid from the material 23 by the well-known phenomena of electrophoresis and electro-osmosis, the electrostatic field 28 being generally uniform and theoretically having a plurality of field lines 29 that are disposed in spaced parallel relation and extend at right angles between the facing surfaces 24 and 25 of the electrodes 21 and 22 as illustrated in FIG. 1.

The means 27 creates such electrostatic field 28 by at least charging one of the electrodes 21 and 22 with either a negative or a positive potential while either oppositely charging the other of the electrodes 21 and 22 or grounding such other electrodes 21 or 22, the means 27 being adapted to maintain the desired amount of potential differential between the electrodes 21 and 22 from just a few volts to many kilovolts such as desired, even though there may be an electrical current flow created between the electrodes 21 and 22.

However, in the embodiment illustrated in FIG. 1, the means 27 is adapted to charge the electrode 21 with one potential through a lead 30 that is disposed in electrical contact with the electrode 21 and to oppositely charge the electrode 22 through a lead 31 that is electrically interconnected to the electrode 22 as illustrated.

It is generally well known that if the electrode 21 is positively charged and the electrode 22 is negatively charged with the particles of the liquid bearing material 23 being negatively charged, the resulting electrostatic field 28 causes the particles of the liquid bearing material 23 to migrate toward the electrode 21 by the phenomena of electrophoresis and the liquid of the liquid bearing material 23 to be forced through the passages 26 of the lower electrode 22 by the phenomena of electro-osmosis.

In order to assist in the removal of the liquid from the liquid bearing material 23 as the electrostatic field 28 is being applied through the material 23 by the electrodes 21 and 22, a pressure differential is created across the electrode 22 by a suction device 32 having its inlet 33 disposed in fluid communication with a chamber defining means 34 that is disposed in substantial sealing relation with the lower surface 35 of the electrode 22 and defines a chamber 36 therewith which is in fluid communication with the inlet 33 of the suction device 32 so that the suction device 32 tends to draw the liquid through the passages 26 in the lower electrode 22 in a manner well known for an evacuating apparatus, the suction device 32 having an outlet 37 for dispensing the removing liquid from the suction device 32 in a manner well known in the art.

The apparatus 20 of this invention includes a plurality of needle-like projections 38 formed of any suitable conductive material and being adapted to project into the material 23 between the electrodes 21 and 22, such as illustrated in FIG. 2, to assist in the dewatering or in the liquid removal of the liquid of the liquid bearing material 23 for the reasons fully set forth in the aforementioned U.S. Patent to Candor, U.S. Pat. No. 4,236,317.

If desired, the projections 38 can each have an end 39 that is secured to a plate 40 so that as the plate 40 moves upwardly or downwardly in the drawings, the projections 38 will move in unison therewith, the plate 40 being illustrated in FIGS. 1 and 2 as being integral and one-piece with the projections 38 and thereby being formed of the same metallic material as the projections 38. However, it is to be understood that plate 40 could be formed of any other suitable material and could actually be formed of electrically insulating material as will be apparent hereinafter.

The upper electrode 21 is provided with a plurality of openings 41 passing completely through the outer 42 and inner surfaces 24 thereof and respectively receive the projections 38 therein so that the projections 38 can pass through the openings 41 to be received into the space between the electrodes 21 and 22 depending upon the position of the plate 40 relative to the electrode 21.

The projections 38 are adapted to have a desired electrical potential imposed thereon by any suitable means and the means 27 previously described can be utilized for such purpose. However, a separate means can be utilized for charging the projections 38 and such separate means is generally indicated by the reference numeral 43 in the drawings and is adapted to charge the plate 40 and, thus, the projections 38 through a suitable lead 44 that is electrically interconnected to the plate 40 in any suitable manner.

The projections 38 each has a diameter that substantially fills the diameter of its respective opening 41 of the electrode 21 and has a substantially flat end surface 45 that is adapted to be disposed substantially flush with the inside surface 24 of the electrode 21 in the manner illustrated in FIG. 1 so that not only does the liquid bearing material 23 become completely blocked from entering the openings 41 in the electrode 21, but also when the projections 38 are charged with a potential that is the same potential that the upper electrode 21 is being charged with by the means 27, the resulting electrostatic field 28 between the electrodes 21 and 22 is initially substantially uniform as illustrated in FIG. 1 by the uniformly spaced apart parallel field lines 29. However, as the projections 38 are being progressively moved into the material 23 as the plate 40 is being progressively moved toward the electrode plate 21 in the manner illustrated in FIG. 2 by suitable ram means or the like (not shown), the end surfaces 45 of the projections 38 create substantially nonuniform electrostatic fields or electric fields 46 with the lower electrode 22 in the manner illustrated in FIG. 2 while the electrode 21 is still tending to maintain the substantially uniform field 28 with the lower electrode 22 whereby the fields 28 and 46 are respectively imposed on the material 23 for a purpose hereinafter described.

If desired, the electrode 21, the electrode 22 and projections 38 can be sonically or ultrasonically vibrated in any suitable manner during the dewatering operation on the apparatus 20 of this invention, such sonic or ultrasonic vibration imparting means being respectively illustrated by devices 47, 48 and 49 and being of any suitable type, such as being of the sonic and ultrasonic vibrating types set forth in the aforementioned three U.S. patents and book. However, it is to be understood that only the projections 38 need be vibrated, only the upper electrode 21 needs to be vibrated, only the lower electrode 22 needs to be vibrated or any desired combination thereof need to be vibrated as desired.

Therefore, it can be seen that the method and apparatus 20 of this invention can be formed of relatively simple parts to operate in a manner now to be described.

With the projections 38 disposed in the up position illustrated in FIG. 1 wherein the lower surfaces 45 thereof are disposed substantially flush with the lower surface 24 of the upper electrode 21, the moisture bearing material 23 is disposed between the electrodes 21 and 22 so as to be in electrical contact with the lower surface 24 of the upper electrode 21 and in electrical contact with the upper surface 25 of the lower electrode 22. The means 27 and 43 are operated in such a manner that the upper electrode 21 and projections 38 are provided with a positive charge of the same value while the lower electrode 22 is provided with an equal and opposite negative charge so that a substantially uniform electrostatic field 28 is formed between the lower electrode 22 and the upper electrode 21 and ends 45 of the projections 38 as illustrated in the drawings to act through the moisture bearing material 23 and thereby to begin the dewatering of the material 23 by causing the liquid to flow through the passages 26 by the phenomenon of electro-osmosis while the particles of the material 23 tend to migrate or move toward the upper electrode 21 by the phenomenon of electrophoresis. Of course, if the particles of the material 23 are already in a preset condition thereof so that the same will not move toward the electrode 21, such as would be the case as if the material 23 was a closely packed sludge cake, a mat of fibrous material, etc., the liquid of the material 23, nevertheless, will tend to move toward the lower electrode 22 and pass out of the passages 26 thereof by the phenomenon of electro-osmosis and the suction being created by the suction device 32 and acting in the chamber 36 to tend to evacuate the chamber 36 will assist such electrostatic field 28 in removing the liquid from the liquid bearing material 23. In addition, by sonically or ultrasonically vibrating the material 23 between the electrodes 21 and 22 by any one or all of the means 47, 48 and 49, such vibrating action coupled with the electrostatic field action 28 will further tend to remove liquid from the material 23 as fully set forth in the aforementioned three U.S. patents and book and, therefore, the theories for liquid removal need not be further discussed.

However, at any desired time during such dewatering operation of the apparatus 20 on the material 23, the plate 40 can be moved downwardly toward the electrode 21 so as to cause the projections 38 to begin to project into the material 23 below the surface 24 of the upper electrode 21 whereby the ends 45 of the projections 38 begin to form the nonuniform electrostatic fields 46 with the lower electrode 22 and it is believed that the nonuniform fields 46 create a greater dewatering effect on the material 23 than is provided by uniform electrostatic field.

In particular, it is believed that because the nonuniform fields 46 have the field lines 50 thereof disposed more closely adjacent each other the closer the same are to the ends 45 of the projections 38 as illustrated in FIG. 2, such more intense portion of the electrostatic fields 46 more closely pack the particles of the liquid material 23 together than if the field 46 had been uniform adjacent the surfaces 45 of the projections 38 to thereby cause a greater dewatering from those particles being more closely compacted not only by the squeezing action between the particles of the material 23, but also by the electro-osmotic effect of the more intense postion of the nonuniform fields 46.

In addition, because some of the particles in the liquid bearing material 23 may not be charged or be chargeable, the more intense portions 50 of the nonuniform fields 46 pack such particles together by the theory of dielectrophoresis. For example, see the U.S. Patent to Jordan et al, U.S. Pat. No. 4,164,460, which is being incorporated into this disclosure by this reference thereto.

Thus, it is believed that as the projections 38 have their ends 45 thereof moved downwardly and further away from the lower surface 24 of the upper electrode 21, such nonuniform fields 46 act on the material 23 in the above manner with the fields 46 becoming more nonuniform as the ends 45 of the projections 38 approach the upper surface 25 of the lower electrode 22.

In fact, the length of the projections 38 could be such that the projections 38 will actually eventually engage against the surface 25 of the lower electrode 22 except that under such conditions there would be a direct shorting between the projections 38 and the lower electrode 22 whereby it may be desired to stop the movement of the projections 38 into the material 23 before the ends 45 of the projections 38 cause arcing or shorting to the lower electrode 22.

Therefore, it can be seen that initially the apparatus 20 provides a uniform electrostatic or electric field 28 between the electrodes 21 and 22 and then subsequently provides a combination of uniform field 28 and nonuniform electrostatic or electric fields 46 in a manner believed to more greatly dewater the material 23 either at a faster rate and/or with a greater amount of liquid removal than if the projections 38 were not being utilized and only the uniform field 28 was being provided between the electrodes 21 and 22 regardless of whether or not the vibration and suction means are being utilized in combination therewith or not.

After the material 23 has been dewatered a desired amount by the apparatus 20, the material 23 can be readily removed therefrom by merely raising the plate 40 relative to the electrode 21 to remove the projections 38 from the space between the electrodes 21 and 22, such raising of the plate 40 causing the upper electrode 21 to strip any material that would tend to stick to the projections 38 off of the projections 38 as the same are removed to the position illustrated in FIG. 1 so that the material 23 can be removed from the apparatus 20 in any suitable manner, such as by removing the electrode 21 and plate 40 if the apparatus 20 is a batch apparatus or by having the material 23 removed out from between the electrodes 21 and 22 at the end of the belt travel thereof as in the case of the aforementioned U.S. Patent to Candor, U.S. Pat. No. 4,236,317.

Of course, the projections 38 can be utilized for dewatering by also moving the electrodes 38 back upwardly from their down positions to the up position of FIG. 1 or could be moved many times upwardly and downwardly within the material 23 to cause a dewatering of the material 23. In fact, the projections 38 can begin the dewatering operation thereof when the same are fully disposed downwardly in the material 23 so that the dewatering action takes place as the projections 38 are merely being moved upwardly from their fully down position to their fully up position. Likewise, the projections 38 can begin the dewatering process in any position thereof whether the same or projected into the material a certain amount, the full amount or not into the material 23 at all as the case may be and then the projections 38 may be operated in any manner and degree of projection and rates of movement thereof during the dewatering process in order to provide for an optimum dewatering action therewith.

In addition, it may be found that it is desirable to change the value of the potential differential between the projections 38 and the lower electrode 22 during the various positions of the projections 38 relative to the electrode 22 so as to vary the intensity of the nonuniform fields 46 during the dewatering operation.

Also, it is to be understood that the ends 45 of the projections 38 can be shaped in any suitable manner so as to enchance not only the projecting action thereof into the material 23, but also to enhance the shape of the nonuniform fields 46 being created thereby.

Figure 3:
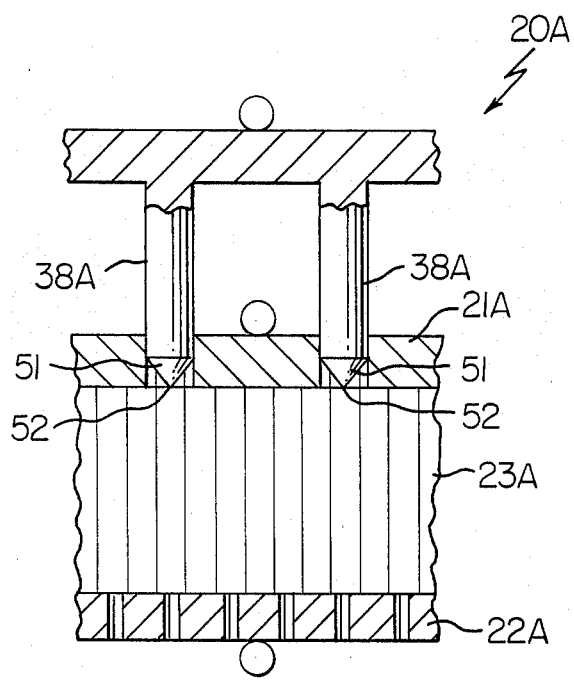
FIG. 3 is a view similar to FIG. 1 and illustrates another apparatus and method of this invention.
Figure 4:
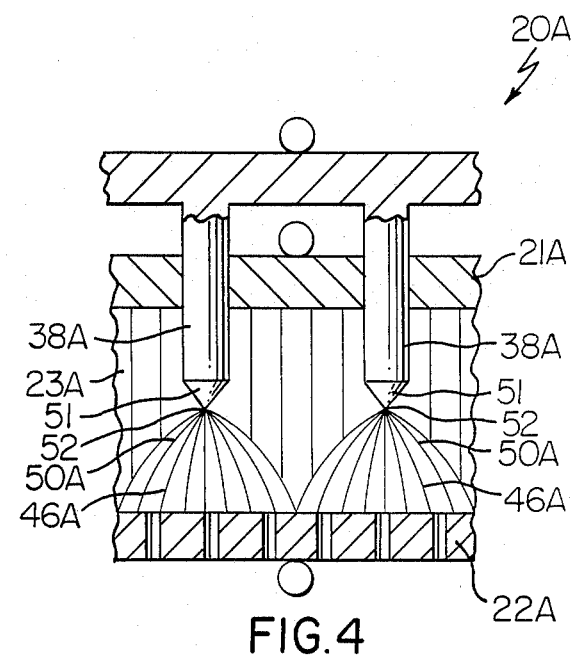
FIG. 4 is a view similar to FIG. 3 and illustrates the apparatus of FIG. 3 in another operating position thereof.
Figure 5:
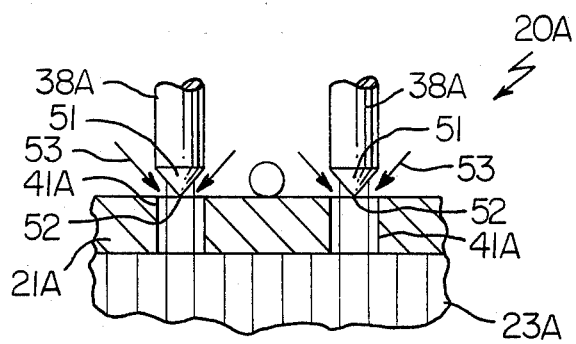
FIG. 5 is a fragmentary view similar to FIG. 3 and illustrates the apparatus thereof in still another operating position thereof.

For example, another method and apparatus of this invention is generally indicated by the reference numeral 20A in FIGS. 3-5 and parts thereof similar to the parts of the method and apparatus 20 previously described are indicated by like reference numerals followed by the reference "A".

In regards to the method and apparatus 20A illustrated in FIGS. 3-5 and the other embodiments of this invention as illustrated in FIGS. 6-15, it is to be understood that such methods and apparatus can have the suction means 32 and chamber defining means 34 utilized therewith as well as the charging means 27 and 43 previously described as the same are merely not illustrated in FIGS. 3-15 (as well as in FIG. 2) in order to simplify the drawings and not for the purpose of indicating that such means are not being utilized therewith. In fact, the embodiments illustrated in FIGS. 8-15 merely illustrate one projection and it is to be understood that a plurality of like projections would be utilized therewith. Also, the embodiments illustrated in FIGS. 8-15 do not provide the vibrating means 47, 48 and 49 as provided in FIGS. 1-5 and it is to be understood that such vibration means would be utilized with the embodiments illustrated in FIGS. 8-15 if desired.

As illustrated in FIGS. 3-5, it can be seen that the apparatus and method 20A is substantially the same as the method and apparatus 20 previously described except that the projection means 38A respectively have substantially pointed end surface means 51 that are substantially conical and have sharp pointed apexes 52 whereby such pointed end surfaces 51 create the nonuniform electrostatic fields 46A previously described with the lower electrode means 22A but with the more intense portions 50A of the fields 46A being more intense than the intense portions 50 of the nonuniform fields 46 previously described because of the pointed arrangement 51, 52 of the projection means 38A. Thus, it is believed that a greater amount of dewatering will be created by the more intense portions 50A of the nonuniform fields 46A than by the intensive portions 50 of the nonuniform fields 46 previously described.

Therefore, since the operation of the method and apparatus 20A is substantially the same as the operation of the method and apparatus 20 previously described, a further description of the operation of the method and apparatus 20A is not necessary.

While the methods and apparatus 20 and 20A previously described each has the means 32 for creating a pressure differential across the lower electrode 22 or 22A, it is to be understood that a pressure differential could be created also across the upper electrode 21 or 21A together with or without the means 32 for creating a pressure differential across the lower electrode 22 or 22A.

For example, reference is now made to FIG. 5 wherein it can be seen that the projections 38A of the apparatus 20A have been moved upwardly so as to provide means for directing air or any desired fluid under pressure as indicated by the arrows 53, into the openings 41A in the upper electrode 21A so as to create a pressure differential across the upper electrode 21A and thereby act on the liquid bearing material 23A to tend to force liquid from the material 23A out through the lower electrode 22A as previously set forth, such upper electrode pressure differential creating means and lower electrode pressure differential creating means also being provided in the aforementioned U.S. Patent to Candor, U.S. Pat. No. 3,931,682.;

While the needle-like projections 38 and 38A have been illustrated and described as being, in effect, in electrical contact with their respective upper electrodes 21 and 21A whereby separate means for charging the projections 38 and 38A need not be provided because merely charging the electrode plates 21 and 21A will cause the projections 38 and 38A to be charged therefrom without requiring the extra charging means 43 previously described, it is to be understood that the needle-like projections of this invention can be insulated from the upper electrode that receives the same respectively through opening means of such upper electrode so that the projections can be charged with a different potential than the potential being imposed upon the electrode carrying such projections.

Figure 6:
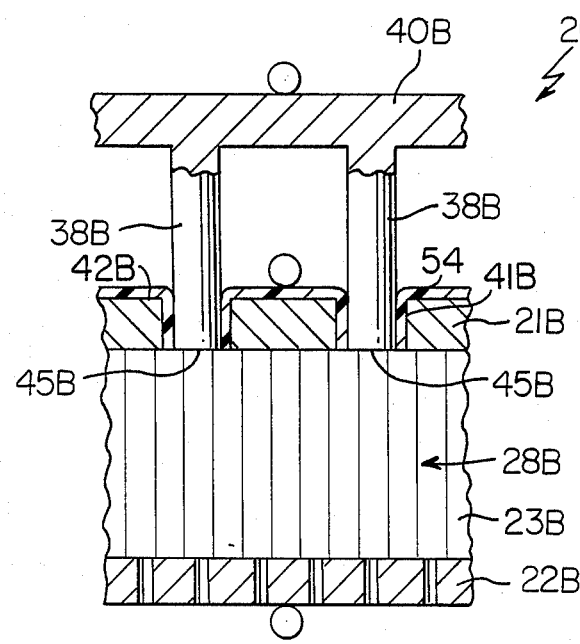
FIG. 6 is a view similar to FIG. 1 and illustrates another apparatus and method of this invention.
Figure 7:
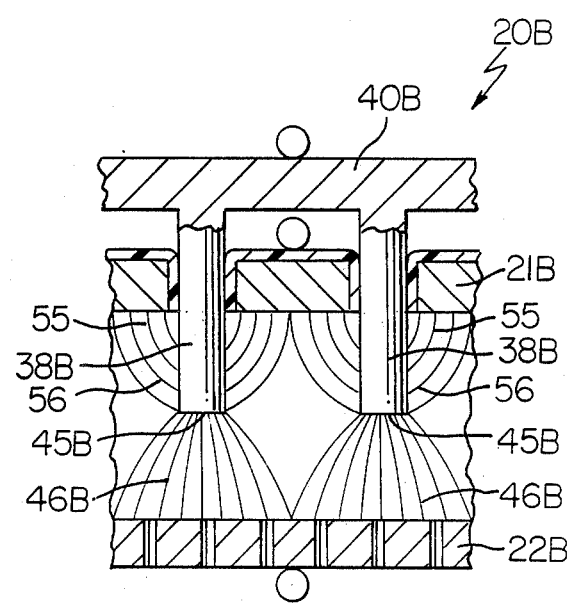
FIG. 7 is a view similar to FIG. 6 and illustrates the apparatus of FIG. 6 in another operating position thereof.

For example, reference is now made to FIGS. 6 and 7 wherein another apparatus and method of this invention is generally indicated by the reference numeral 20B and parts thereof similar to the parts of the method and apparatus 20 and 20A previously described are indicated by like reference numerals followed by the reference letter "B".

As illustrated in FIGS. 6 and 7, the apparatus and method 20B is substantially the same as the method and apparatus 20 previously described except that the upper electrode 21B carries electrically insulating means 54 that not only lines the opening means 41B thereof so as to prevent the projections 38B from making electrical contact with the upper electrode 21B, but also the insulating means 54 covers the upper surface 42B of the electrode 21B so that should the plate 40B for the needle-like projections 38B be charged with a charge different than the potential charge of the upper electrode 21B, a resulting field therebetween will be muted and thereby not adversely affect the operation of the apparatus 20B as hereinafter set forth.

The initial operation of the apparatus and method 20B of FIGS. 6 and 7 is substantially the same as the method and apparatus 20 of FIGS. 1 and 2 wherein the upper electrode 21B and plate 40B are charged with the same potential, such as positive, while the lower electrode 22B is charged with the opposite potential, such as negative, to create the uniform field 28B therebetween for acting on the material 23B disposed between the electrodes 21B and 22B.

Thereafter, the upper plate 40B is moved toward the upper electrode 21B so as to cause the projections 38B to now have the ends 45B thereof received within the material 23B and at a certain point in the depth of projection of the projections 38B into the material 23B, the potential to the upper electrode 21B can be changed to ground or to a negative potential that is opposite to the potential of the projections 38B such as by being charged with the same potential as the lower electrode 22B so that the projections 38B not only form the nonuniform fields 46B with the lower electrode 22B for the purpose previously described but also the projections 38B create upper nonuniform fields 55 with the upper electrode 21B to operate on the material 21B between the upper electrode 21B and the ends 45B of the projections 38B in such a manner that the more intense portions 56 of the upper nonuniform fields 55 tend to move the particles of the liquid bearing material 23B with a greater intensity toward the lower ends 45B of the projections 38B than if the fields had merely been uniform.

If desired, during the operation of the apparatus and method 20B, the charging of the upper electrode 21B can be changed from being charged with the same potential as the projections 38B back to being grounded or being charged with an opposite potential to the projections 38B and then again back to the same potential as the projections 38B during the time the projections 38B are being utilized intermediate the electrodes 21B and 22B to dewater the material 23B therebetween.

Other means of this invention for electrically insulating the projections from the electrode through which the projections are being moved is to insulate the projections themselves from the electrode receiving the same can be used.

Figure 8:
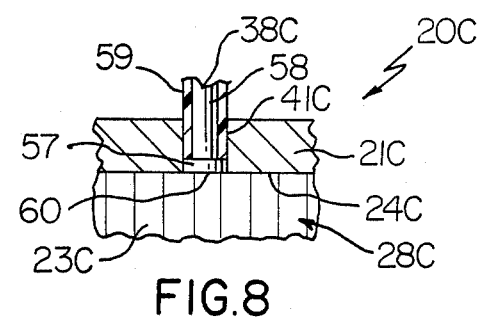
FIG. 8 is a fragmentary view similar to FIG. 1 and illustrates another apparatus and method of this invention.
Figure 9:
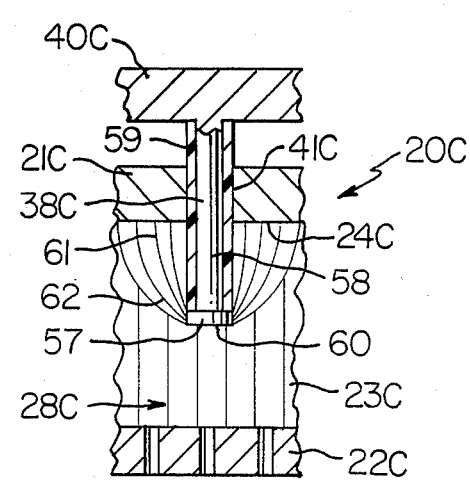
FIG. 9 is a view similar to FIG. 8 and illustrates the apparatus of FIG. 8 in another operating position thereof.

For example, reference is now being made to FIGS. 8 and 9 wherein another apparatus and method of this invention is generally indicated by the reference numeral 20C and parts thereof similar to the parts of the methods and apparatus 20–20B previously described are indicated by like reference numerals followed by the reference letter "C".

As illustrated in FIGS. 8 and 9, it can be seen that the projections 38C are each formed in a manner similar to a nail wherein the same has an enlarged disk-like head or end 57 and a substantially smaller diameter shaft-like portion or body 58 that is interconnected to the plate 40C, each head 57 having a diameter that is substantially the same as the diameter of its respective opening 41C that is formed through the upper electrode plate 21C as illustrated in FIG. 8. The shaft or body portion 38 of each projection 38C is covered with electrically insulating material 59 so that the projections 38C can readily move in their respective openings 41C from the position illustrated in FIG. 8 to the position illustrated in FIG. 9 while completely blocking any fluid flow through the openings 41C in the same manner as the projections 38 previously described.

In this manner, when the projections 38C are in the position illustrated in FIG. 8, it can be seen that the heads 57 of the projections 38C have their lower flat surfaces 60 disposed substantially flush with the lower flat surface 24C of the upper electrode 21C so that the upper electrode 21C can be charged with the same charge as the projections 38C to produce the uniform electrostatic field 28C previous described.

However, as the projections 38C are being moved into the material 23C in the manner illustrated in FIG. 9, by maintaining the charge on the projections 38C with the same potential as the electrode 21C, the projections 38C will form the nonuniform fields 46 with the lower electrode 22C as previously described.

However, by charging the projections 38C with the same potential as the lower electrode 22C and opposite to the upper electrode 21B, the enlarged heads 57 of the projections 38C will respectively form upper nonuniform fields 61 with the upper electrode 21C in such a manner that the more intense portions 62 of the nonuniform fields 61 will be adjacent the heads 57 of the projections 38C and tend to move the water toward the heads 57 with a greater intensity than the uniform field 28C as the projections 38C are completely insulated from the upper electrode 21C once the heads 57 have cleared the openings 41C in the electrode 21C.

Therefore, the charging of the projections 38C in upper electrode 21C after the heads 57 of the projections 38C have been moved into the material 23C beyond the lower surface 24C of the upper electrode 21C permits any combination of charging between the projections 38C and the upper electrode 21C as desired.

While the various needle-like projections of this invention have been previously described as projecting through openings in the upper electrode of the various arrangements, it is to be understood that the projections of this invention can project through opening means in the lower electrode if desired.

Figure 10:
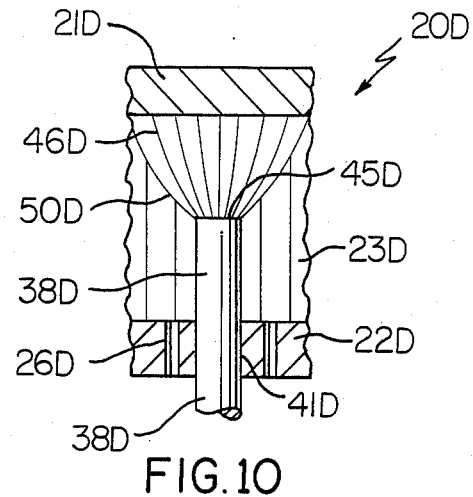
FIG. 10 is a view similar to FIG. 1 and illustrates another apparatus and method of this invention.
Figure 11:
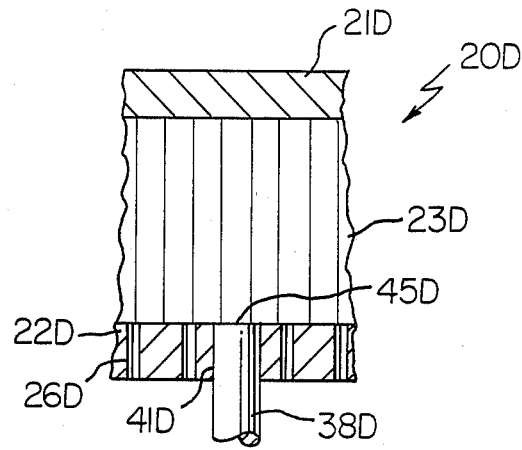
FIG. 11 is a view similar to FIG. 10 and illustrates the apparatus of FIG. 10 in another operating position thereof.

For example, reference is now made to FIGS. 10 and 11 wherein another apparatus and method of this invention is generally indicated by the reference numeral 20D and parts thereof similar to the parts of the apparatus and methods 20-20C previously described are indicated by like reference numerals followed by the reference letter "D".

As illustrated in FIGS. 10 and 11, the lower electrode 22D is provided with a plurality of openings 41D in addition to the passages 26D thereof for having the projections 38D respectively received therein so that the projections 38D can be charged with the same charge as the lower electrode 22D to form the nonuniform fields 46D with the upper electrode 21D so that the more intense portion 50D of each nonuniform field 46D is adjacent the end 45D of the respective projection 38D.

In fact, it may be found that it is best to start with the projections 38D fully projected into the material 23D at the start of the dewatering operation and subsequently pull the projections 38D down to the final position illustrated in FIG. 11. But, of course, the projections 38D could start in the position of FIG. 11 if desired or in any other position as previously described.

Figure 12:
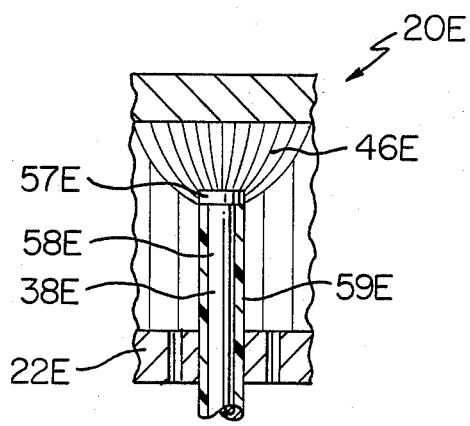
FIG. 12 is a view similar to FIG. 1 and illustrates another apparatus and method of this invention.
Figure 13:
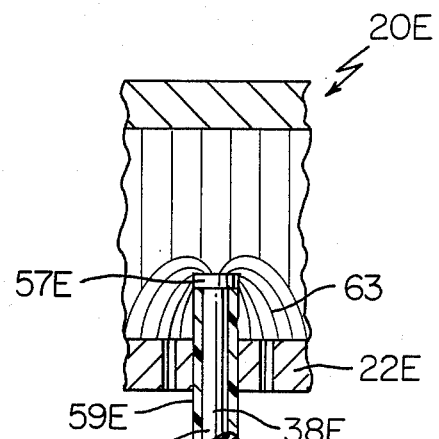
FIG. 13 is a view similar to FIG. 12 and illustrates the apparatus of FIG. 12 in another operating position thereof.

While the projections that project through the openings in the lower electrode of the arrangement of this invention can be insulated from such lower electrode in the same manner as illustrated in FIGS. 6 and 7, the projections are illustrated in FIGS. 12 and 13 as being insulated from the lower electrode in the same manner as the upper projections in FIGS. 8 and 9.

In particular, another method and apparatus of this invention is generally indicated by the reference numeral 20E in FIGS. 12 and 13 and parts thereof similar to the parts of the apparatus and methods 20-20D of this invention are indicated by like reference numerals followed by the reference "E".

As illustrated in FIGS. 12 and 13, the projections 38E have the enlarged heads 57E and have the body portions 58E thereof covered with insulation 59E so as to permit the electrodes 38E to be charged with a charge different than the charge on the lower electrode 22E, if desired.

For example, it can be seen in FIG. 13 that when the projection 38E is charged with a charge different than the charge on the lower electrode 22E and the projection 38E has the head 57E disposed within the material 23E between the electrodes 21E and 22E, a lower nonuniform electrostatic field 63 is formed between the head 57E and the lower electrode 22E with the nonuniform field 63 having its more intense portion 64 being disposed adjacent the head 57E as previously described.

Therefore, it can be seen that when the head 57E of a projection 38E is closer to the upper electrode 21E as illustrated in FIG. 12, the projection 38E can be provided with a charge that is opposite to the charge of the upper electrode 21E to create the upper nonuniform field 46E in the same manner as the upper nonuniform field 46D previously described. However, as the projection 38E has its end 57E moved closer to the lower electrode 22E, the charge on the projection 38E can be changed to be opposite to the charge on the lower electrode 22E to form the lower nonuniform electrostatic field 63 as illustrated in FIG. 13.

While the various apparatus and method of this invention previously described has the plurality of needle-like projection means either being disposed through the upper electrode or through the lower electrode, it is to be understood that the needle-like projections of this invention can have one set thereof projecting through the upper electrode and another set thereof projecting through the lower electrode, the two sets of needle-like projections either being in an aligned relation or being staggered relative to each other in any desired pattern.

Figure 14:
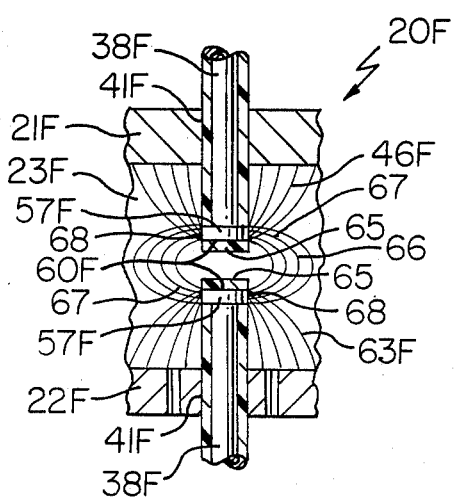
FIG. 14 is a view similar to FIG. 1 and illustrates another apparatus and method of this invention.

For example, another apparatus and method of this invention is generally indicated by the reference numeral 20F in FIG. 14 and parts thereof similar to the parts of the apparatus and methods 20-20E previously described are indicated by like reference numerals followed by the reference letter "F".

As illustrated in FIG. 14, the apparatus and method 20F has a plurality of needle-like electrodes 38F previously described and extending through cooperating opening means 41F in the upper electrode 21F. Similarly, a plurality of electrode means 38F extend through opening means 41F in the lower electrode 22F with the lower projections 38F being formed in a manner similar to the upper projections 38F.

In addition, each projection 38F has insulating means 65 disposed on the outer end surface 60F of the enlarged head 57F thereof.

While the projection means 38F of the apparatus and method 20F of this invention have the upper set and the lower set thereof disposed in axially aligned relation, it is to be understood that the same could be staggered relative to each other so that the lower set of projections 38F could extend all the way from the bottom electrode 22F to the upper electrode 21F and the upper projections 38F could extend all the way from the upper electrode 21F to the bottom electrode 22F as desired.

However, in the embodiment illustrated in FIG. 14 wherein the upper and lower projections 38F are disposed in axially aligned relation, it can be seen that when the projections 38F are respectively disposed within the liquid bearing material 23F between the electrodes 21F and 22F, the upper projections 38F can be charged with a potential that is opposite to the potential on the lower projections 38F so as to form a nonuniform field 66 between the enlarged heads 57F of the axially aligned projections 38F as illustrated in FIG. 14 wherein it can be seen that each nonuniform field 66 has the opposed intense portions 67 thereof respectively disposed adjacent the peripheral edges 68 of the respective enlarged heads 57F that are not covered by insulation means, such nonuniform field 66 acting on the liquid bearing material 23F between the electrodes 21F and 22F to tend to cause the liquid to move from the upper projection 38F to the lower projection 38F and the particles in the liquid bearing material 23F to move from the lower projection 38F to the upper projection 38F.

In addition, the upper projection 38F can be charged with a potential different than the potential charge on the upper electrode 21F to form the upper nonuniform field 46F for the purpose previously described. Likewise, the lower projection 38F can be charged with a potential that is different than the potential on the lower electrode 22F to form the lower nonuniform field 63F. For example, the upper electrode 21F can have a positive charge thereon while the upper electrode 38F has a negative charge thereon. The lower electrode 22F can have a negative charge thereon and the lower projection 38F can have a positive charge thereon.

It is to be understood that during the operation of the apparatus and method 20F the upper and lower projections 38F can have the ends 65 thereof disposed flush with the facing surfaces 24F and 25F of the electrodes 21F and 22F so that substantially uniform electrostatic fields are created between the electrodes 21F and 22F and thereafter the projections 38F can be moved inwardly to any desired degree into the material 23F and then moved outwardly relative to the material 23F as desired. For example, the two projections 38F illustrated can actually have the insulation means 65 thereof touching each other so that the projections 38F will move in unison with the intermediate electrostatic field 66 actually beginning just below the upper electrode 21F and then be caused to move downwardly to almost the bottom electrode 22F as desired. Also, it is to be understood that the spacing between the ends 65 of the projections 38F of the upper and lower projections 38F can be varied from a close spacing therebetween to a wide spacing therebetween so as to cause the various fields 46F, 66 and 63F to operate in any desired manner on the material 23F.

While the method and apparatus 20F previously described has a plurality of upper projections 38F and a plurality of lower projections 38F, it is to be understood that the method and apparatus of this invention can have projections that always extend between both the upper and lower electrodes of the apparatus, if desired.

Figure 15:
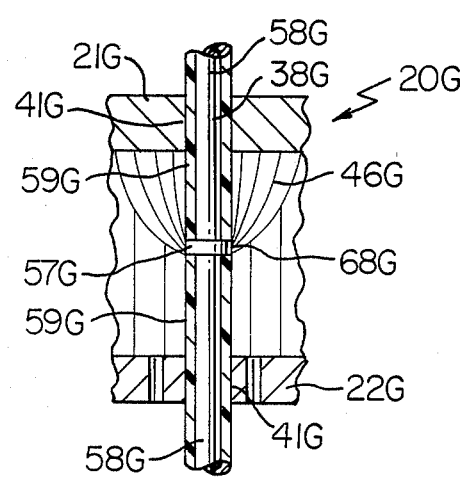
FIG. 15 is a view similar to FIG. 1 and illustrates another method and apparatus of this invention.

For example, another apparatus and method of this invention is generally indicated by the reference numeral 20G in FIG. 15 and parts thereof similar to the parts of the apparatus and methods 20–20F previously described are indicated by like reference numerals followed by the reference letter "G".

As illustrated in FIG. 15, a plurality of projections 38G are provided (only one such projection 38G being illustrated in FIG. 15) that respectively pass through aligned openings 41G in the upper electrode 21G and lower electrode 22G, each projection 38G comprising a body portion 58G and an enlarged disk-like intermediate portion 57G that has only its other peripheral edge 67G exposed as the remainder of the body portion 58G on opposite sides of the head 57G is covered by the insulating material 59G as previously described.

In this manner, each projection 38G can be provided with a charge that is opposite to the charge on the upper electrode 21G so as to form the upper nonuniform field 46G therewith with such nonuniform field 46G being caused to move from the upper electrode 21G down toward the bottom electrode 22G as the intermediate portion 57G of the projection 38G is moved downwardly. Of course, as the projection 38G is moved downwardly, the projection 58G can have the charge thereon changed so as to be opposite to the charge on the lower electrode 22G and thereby cause a field similar to the field 63 of FIG. 13 to now occur between the outer peripheral surface 68G of the enlarged head 57G and the lower electrode 22G as desired.

Therefore, it can be seen that in all of the various embodiments of the apparatus and method of this invention, the projections are utilized to create nonuniform fields that will act on the liquid bearing material that is disposed between the normal or conventional electrodes so as to enhance the amount of dewatering and/or cake solidification as the case may be.

It is also to be understood that during the operation of the various apparatus and methods of this invention, the charging of the various electrodes and projections can be arranged so that the same will oscillate between the chargings thereof so that the resulting electrostatic fields will oscillate and thereby cause a dielectric heating of the liquid bearing material to a certain degree and then the oscillation of the fields can be terminated and the fields then being used to perform their dewatering function in the manner previously described, the heating of the liquid bearing material facilitating the dewatering thereof because of the lowering of the viscosity of the liquid through the heating thereof.

In fact, it may be found that the sonic or ultrasonic vibrating of the liquid bearing material through the nonuniform fields created by the projections of this invention will result in a dielectric heating of the liquid bearing material through just the action of the particles and liquid moving across the angled field lines created by the projections in much the same manner as fully set forth in the U.S. patent to Candor, U.S. Pat. No. 4,404,754 whereby this patent is also being incorporated into this disclosure by this reference thereto.

It is to be understood that the projections of this invention can be uniformly arranged on their respective carrying plate or could be arranged in any desired pattern thereon. Also, the projections could have any desired lengths and diameters relative to each other or could be uniform relative to each other as desired.

In fact, while the projections of this invention have been described as "needle-like", it is to be understood that such term could apply to projections that are similar in size and shape to sewing needles or smaller or could apply to large knitting needles or larger as desired.

Also, it may be found that the vibration of the projections of this invention and/or the vibration of the liquid bearing material relative to the projections will not only enhance the dewatering operation as previously described, but also said vibration action may prevent the particles of the liquid bearing material from adhering to the projections and/or electrodes so as to enhance subsequent removal of the dewatered material from the apparatus of this invention.

Also, while the projections of this invention have been illustrated and described as having a substantially circular transverse cross-sectional configuration, it is to be understood that the projections of this invention can have any desired transverse cross-sectional configuration and, in fact, can have a serrated, knife-like or rectangular configuration with the longitudinal axis of the projection extending parallel to the electrode carrying the same rather than transverse thereto as previously described. For example, see FIGS. 16–18 of the U.S. patent to Candor et al, U.S. Pat. No. 3,633,282, whereby this patent is being incorporated into this disclosure by this reference thereto.

In all of the arrangements of this invention previously described, it is to be understood that the voltage between the upper and lower electrodes can be maintained substantially uniform throughout the entire dewatering operation or may vary throughout the entire dewatering operation. For example, the voltage between the two main electrodes can initially be any amount, such as 50 volts, and then as more and more liquid is removed, the voltage can be increased so that by the time the dewatering operation is ended, the voltage between the two main electrodes can be several thousand volts or more as desired. This is because the current flow, if any, between the main electrodes decreases as the liquid is being removed. Likewise, such uniform or varying voltage can be provided between the projections of this invention and their cooperating main electrode or electrodes.

It may be found that when dewatering with the main pair of electrodes the removal of the liquid of the liquid bearing material by the uniform electrostatic field eventually produces a cake therefrom that prevents further dewatering thereof because the liquid remaining in the cake no longer is in electrical contact with at least one of the main electrodes. However, it is believed that by inserting the projections of this invention into such cake, further dewatering thereof will take place not only through the previously described non-uniform field action created thereby, but also by the fact that such charged electrodes will now be placed into electrical contact with the remaining liquid in the cake to provide an electrical current path therethrough which will occur between such projections and at least one of the electrodes that provide a potential differential therebetween as it may be found that it is best to always have some electrical current flow through the liquid bearing material to produce a liquid removing action therefrom.

In contrast, it may be found that it is desirable to completely electrically insulate the projections of this invention from the liquid bearing material as well as to electrically insulate the main electrodes therefrom either by having the contacting surfaces of said main electrodes covered with electrically insulating material or having the same spaced from the liquid bearing material as fully illustrated and described in the aforementioned patent to Candor, U.S. Pat. No. 4,236,317.

Therefore, it can be seen that the terms "electrostatic field" and "electric field" as used in this application are synonomous and are intended to describe a uniform or non-uniform field that is created through the liquid bearing material disposed between two members that have a potential differential imposed thereon whether those members are in electrical contact with the liquid bearing material or electrically insulated therefrom. Thus, it is believed that a higher voltage between such members must be utilized to remove liquid from the liquid bearing material when no electrical current is flowing between such members and through the liquid bearing material than the voltage utilized when electrical current is flowing between such members and through the liquid bearing material. However, it is realized that different liquid bearing materials have different conductivities and that some liquid bearing materials have substantially no conductivity whereby the voltage utilized for dewatering a particular liquid bearing material will be different than the voltage utilized for dewatering another type of liquid bearing material and that the voltage utilized will be different if the members are electrically insulated from a particular liquid bearing material than the voltage utilized if the members are in electrical contact with that particular liquid bearing material.

Therefore, it can be seen that this invention not only provides a new apparatus for removing liquid from liquid bearing material and the like, but also this invention provides a new method for removing liquid from liquid bearing material or the like.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In an apparatus for removing liquid from liquid bearing material and comprising a pair of spaced apart electrodes for being disposed on opposite sides of said material, means for creating an electrostatic field between said electrodes for acting through said material to remove liquid from said material, and a plurality of needle-like projections for being disposed in said material between said electrodes to assist in removing liquid from said liquid bearing material, one of said electrodes having a plurality of opening means passing therethrough for respectively receiving said projections therethrough so that said projections can project into said material between said electrodes, the improvement comprising means operatively interconnected to said projections to move said projections through said opening means of said one electrode to different positions thereof relative to said material between said electrodes and relative to said one electrode.

2. An apparatus as set forth in claim 1 and including means for creating non-uniform electrostatic fields between said projections and at least one of said electrodes.

3. An apparatus as set forth in claim 2 wherein said means for creating said non-uniform electrostatic fields comprises means for grounding said projections.

4. An apparatus as set forth in claim 2 wherein said means for creating said non-uniform electrostatic fields comprises means for charging said projections with one of a negative potential and a positive potential.

5. An apparatus as set forth in claim 4 wherein said means for creating said electrostatic field between said electrodes comprises means for charging at least one of said electrodes with one of a negative potential and a positive potential.

6. An apparatus as set forth in claim 1 wherein said means for moving said projections through said opening means to different positions thereof relative to said material between said electrodes comprises a plate means carrying said projections thereon and being disposed adjacent a side of said one electrode opposite to the side thereof that faces said material.

7. An apparatus as set forth in claim 1 and including means for electrically insulating said projections from said one electorde that has said opening means passing therethrough.

8. An apparatus as set forth in claim 1 wherein the other of said electrodes has opening means passing therethrough, and a plurality of other needle-like projections respectively received through said opening means of said other electrode so as to be adapted to project into said material between said electrodes.

9. An apparatus as set forth in claim 1 wherein the other of said electrodes has opening means passing therethrough and respectively receiving said projections therein whereby said projections extend completely between said electrodes and through said opening means thereof.

10. In a method for removing liquid from liquid bearing material and comprising the steps of providing a pair of spaced apart electrodes so as to be disposed on opposite sides of said material, disposing said material between said electrodes, creating an electrostatic field between said electrodes so as to act through said material to remove liquid from said material, disposing a plurality of needle-like projections in said material between said electrodes to assist in removing liquid from said liquid bearing material, forming one of said electrodes with a plurality of opening means passing therethrough, and disposing said projections respectively through said opening means so that said projections project into said material between said electrodes, the improvement comprising the step of moving said projections through said opening means of said one electrode to different positions thereof relative to said material between said electrodes and relative to said one electrode.

11. A method as set forth in claim 10 and including the step of creating non-uniform electrostatic fields between said projections and at least one of said electrodes so as to act on said material.

12. A method as set forth in claim 11 wherein said step of creating said non-uniform electrostatic fields comprises the step of grounding said projections.

13. A method as set forth in claim 11 wherein said step of creating said non-uniform electrostatic fields comprises the step of charging said projections with one of a negative potential and a positive potential.

14. A method as set forth in claim 13 wherein said step of creating said electrostatic field between said electrodes comprises the step of charging at least one of said electrodes with one of a negative potential and a positive potential.

15. A method as set forth in claim 10 wherein the step of moving said projections through said opening means to different positions thereof relative to said material between said electrodes comprises the step of moving said projections in unison with a plate means that is interconnected to said projections and is disposed to the side thereof that faces said material.

16. A method as set forth in claim 10 and including the step of electrically insulating said projections from said one electrode that has said opening means passing therethrough.

17. A method as set forth in claim 10 and including the steps of forming the other of said electrodes with opening means passing therethrough, and disposing a plurality of other needle-like projections respectively through said opening means of said other electrode so as to project into said material between said electrodes.

18. A method as set forth in claim 10 and including the step of forming the other of said electrodes with opening means passing therethrough and respectively receiving said projections therein whereby said projections extend completely between said electrodes and through said opening means thereof.

* * * * *